United States Patent [19]

Houston

[11] 4,252,263
[45] Feb. 24, 1981

[54] METHOD AND APPARATUS FOR THERMO-COMPRESSION DIFFUSION BONDING

[75] Inventor: Douglas E. Houston, Ballston Lake, N.Y.

[73] Assignee: General Electric Company, Schenectady, N.Y.

[21] Appl. No.: 139,177

[22] Filed: Apr. 11, 1980

Related U.S. Application Data

[60] Division of Ser. No. 927,344, Jul. 24, 1978, abandoned, Continuation-in-part of Ser. No. 889,099, Mar. 22, 1978, abandoned.

[51] Int. Cl.³ .................. B23K 20/02; B23K 20/14
[52] U.S. Cl. .......................... 228/193; 228/205; 228/219; 228/243; 228/263 G
[58] Field of Search ............... 228/193, 243, 205, 219, 228/263

[56] References Cited

U.S. PATENT DOCUMENTS

| | | | |
|---|---|---|---|
| 3,295,089 | 12/1966 | Moore | 357/81 X |
| 3,657,611 | 4/1972 | Yoneda | 357/81 |
| 3,761,783 | 9/1973 | Kroger et al. | 357/81 X |
| 3,896,256 | 7/1975 | Wolski | 228/206 X |
| 4,046,305 | 9/1977 | Brown et al. | 228/194 |

OTHER PUBLICATIONS

Cunningham et al., "The Mechanism of Pressure Bonding" Battelle Memorial Institute *Report BMI-1512* Apr. 1961.

Primary Examiner—Kenneth J. Ramsey
Attorney, Agent, or Firm—Marvin Snyder; James C. Davis

[57] ABSTRACT

A method which utilizes thermo-compression diffusion bonding to attach a metal foil to structured copper. The different rate of expansion of metal press members with temperature creates a force which squeezes the foil and copper together to achieve a bond when the press and the parts to be joined are heated to an elevated temperature. Because of the high pressure achieved by the press, diffusion bonding occurs at a low enough temperature to avoid problems associated with use of the liquid phase of any of the metals undergoing bonding.

7 Claims, 4 Drawing Figures

METHOD AND APPARATUS FOR THERMO-COMPRESSION DIFFUSION BONDING

This is a division of application Ser. No. 927,344, filed July 24, 1978, now abandoned, which is a continuation-in-part of application Ser. No. 889,099, filed Mar. 22, 1978, now abandoned.

BACKGROUND OF THE INVENTION

This invention relates to bonding methods and presses therefor and more particularly to method and apparatus for achieving a strong diffusion bond between a metal foil and structured copper.

DESCRIPTION OF THE PRIOR ART

In high power semiconductor devices such as thyristors and transistors, the ability to remove heat from the device is one of the most important considerations in achieving high power operation. Structured copper (a bundle of filamentary strands of copper packed closely together) when attached to an electrode of a semiconductor device provides a means of supplying power to the device while removing heat and simultaneously relieving stress occurring at the surface of the electrode. Structured copper is generally stored in a retaining ring to keep the individual strands of the copper from separating and falling apart. However, when the retaining ring is removed prior to attachment of the structured copper buffer to the semiconductor device, a means must be provided to maintain the structural integrity of the structured copper.

Structured copper buffer disks have been fabricated from short length sections of copper cable. Such buffers are capable of withstanding a substantial amount of handling after the retaining ring has been removed. This structural strength results from the twisting together of the individual strands of cable copper. However, in this type of structured copper, the individual strands of copper are not completely free to move within the plane of the disk and thus such structured copper is inferior to straight wire structured copper in its stress relieving capability.

Solder has been used to increase the structural integrity of structured copper disks. To accomplish this solder is applied to the ends of the filamentary strands of the structured copper disk on one side or on both sides. Although this makes this structured copper stronger, it also degrades the thermal properties of the copper. Additionally, the solder may flow into the voids between the strands of copper, thus impairing the stress relieving properties of the structured copper.

Structured copper strain buffers of the prior art exhibit limited stress relieving properties and reduced thermal conductivities as described above. The present invention concerns a diffusion bonding press and a method of using this press to bond a metallic foil to a structured copper strain buffer disk. Providing such a foil to the structured copper disk greatly increases its structural integrity without imparing its thermal conductivity or stress relieving capability. The press of the present invention achieves a diffusion bond at a relatively low temperature.

It is an object of this invention to provide a press for bonding a metallic foil to structured copper to create a disk of high, structural strength.

It is also an object of this invention to provide a method of bonding a metallic foil to a structured copper buffer in a manner which preserves the stress relieving properties of the structured copper buffer.

These and other objects of the invention will become apparent to those skilled in the art upon consideration of the following description of the invention.

BRIEF SUMMARY OF THE INVENTION

The present invention is directed toward low temperature diffusion bonding by providing a diffusion bonding press to bond a metal foil to a structured copper buffer at a sufficiently low elevated temperature such that the bond does not crack when it contracts as it cools down from the bonding temperature. In accordance with the invention, the different degree of expansion of two metals with increase of temperature is used to create a force to squeeze together a metal foil and a structured copper buffer.

Briefly, in accordance with one preferred embodiment of the invention, a press for diffusion bonding metal sufaces together comprises two metallic plate means aligned parallel to each other. Each plate means exhibits a predetermined thermal coefficient of expansion and support means are provided to connect the plate means together. Sufficient space is left between the plate means to accommodate metallic elements to be pressed together. The support means are comprised of a material selected to have a thermal coefficient of expansion such that, when the press assembly (including plate means and support means) is heated to an elevated temperature during a diffusion bonding operation, the metallic plate means expand to a greater extent than do the support means. Thus, a compressive force is exerted by the two plate means upon the elements to be bonded together between the two plate means. Structured copper and metal foil may be bonded together in the above described manner.

In accordance with another embodiment of the invention, a method for diffusion bonding metal surfaces together is provided whereby a structured copper disk and a metallic foil are positioned in substantial abutment. The disk and metallic foil are then surrounded by an inert atmosphere and squeezed together with high pressure at a sufficiently low elevated temperature to cause diffusion bonding of the metallic foil into the disk.

The features of the invention believed to be novel are set forth with particularity in the appended claims. The invention itself, however, both as to organization and method of operation, together with further objects and advantages thereof, may best be understood by reference to the following description taken in conjunction with the accompanying drawings.

DETAILED DESCRIPTION OF THE PREFERRED EMBODIMENT

Figure 1:
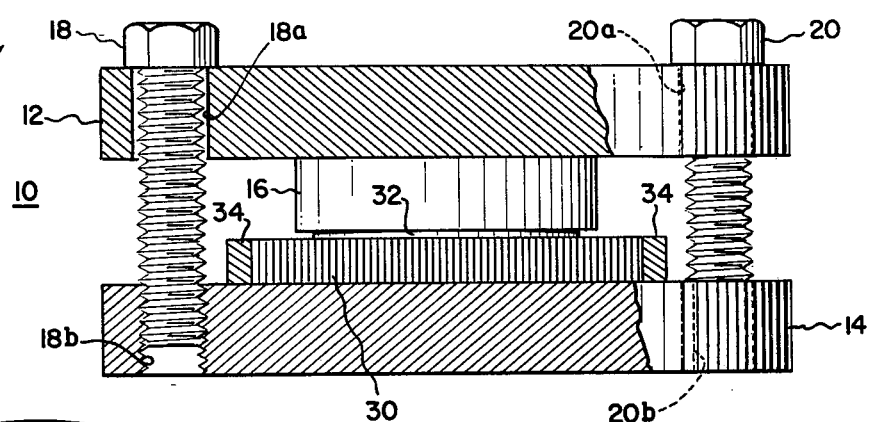
FIG. 1 is a side view of the diffusion bonding press of the present invention.
Figure 2:
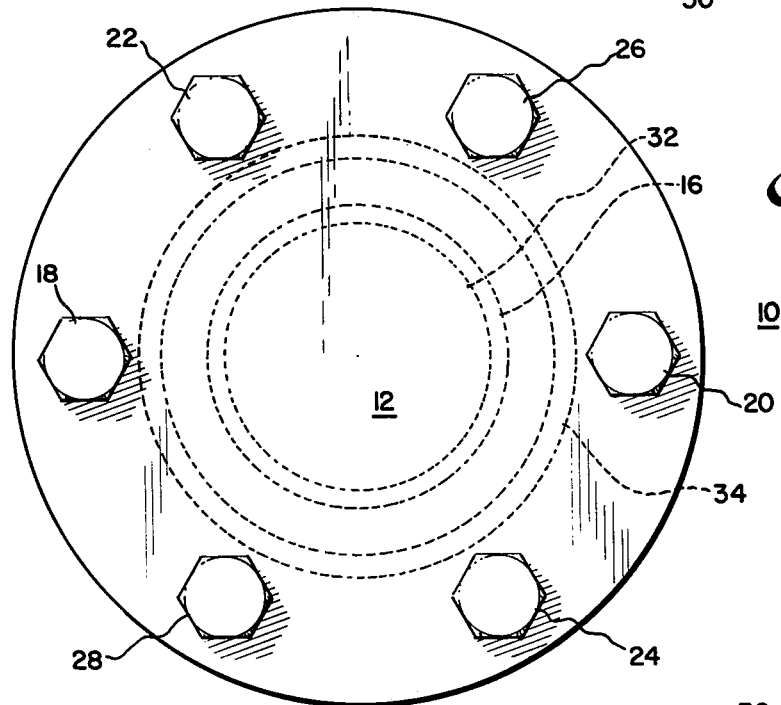
FIG. 2 is a top view of the diffusion bonding press shown in FIG. 1.

FIG. 1 illustrates the thermo-compression diffusion bonding press 10 of the invention having an upper metallic plate 12 and a lower metallic plate 14, each plate preferably being made of stainless steel. A metallic pressing block 16 comprised of stainless steel, copper, aluminum or aluminum alloy may conveniently be positioned at the center of upper plate 12 as illustrated. As shown, the upper plate means comprised of upper plate 12 and pressing block 16 and lower plate means 14 are oriented parallel to each other with a space therebetween. Upper plate 12, pressing block 16 and lower plate 14 may be of circular or other convenient configuration. A series of holes 18a, 20a, 22a, 24a, 26a and 28a are provided at equal intervals around the periphery of upper plate 12, as shown in FIG. 2.

Lower plate 14 is provided with a series of threaded holes each aligned with a respective one of the holes of upper plate 12. In FIG. 1 threaded holes 18b and 20b of lower plate 14 are shown in alignment with holes 18a and 20a, respectively, in upper plate 12. The upper and lower plate means are spaced apart by support means which, as shown in FIG. 2, comprise threaded bolts 18, 20, 22, 24, 26 and 28 inserted in their respective holes so as to hold upper plate 12 rigidly to lower plate 14. These bolts are preferably comprised of a steel other than stainless steel.

Other metals than those specifically discussed above may be used to comprise plates 12 and 14, pressing block 16 and the support means (metallic bolts 18–28). The criteria for selection of such metals is that they must be chosen such that the total expansion of plates 12 and 14 and pressing block 16 with temperature is greater than that of the metal chosen for the support means. For example, pressing block 16 may be comprised of an aluminum alloy such as Dural. Dural has a thermal coefficient of expansion significantly greater than that of stainless steel. Thus, pressing block 16 may be made of a thinner block of Dural than of stainless steel while still maintaining the same overall amount of expansion of block 16 per given temperature rise.

The materials to be diffusion bonded together (such as structured copper 30 and metal foil 32, shown in FIG. 1) are positioned in the press 10 between metallic pressing block 16 and lower plate 14. Various metal foils, such as gold foil and copper foil may be bonded to other metals such as copper, gold and silver using the diffusion bonding press of the instant invention. Alternately, other metals of high thermal and electrical conductivity may be bonded together in practicing the disclosed invention.

In a preferred embodiment of the invention, a method of diffusion bonding a metallic foil to a structured copper disk is provided. A disk of structured copper 30 typically is comprised of a bundle of close packed filamentary strands of copper. These strands may conveniently be 10 mils in diameter and of equal length ranging from 0.1 to 1 cm. Structured copper is a very fragile material and the strands of the structured copper easily separate and fall apart upon handling. To prevent such destruction of the structured copper disk 30, a retaining ring 34 is placed around the periphery of the unbonded structured copper to hold it together. Retaining ring 34 is illustrated in FIGS. 3 and 4.

It is desirable to use structured copper comprised of strands of uncleaned copper (that is, copper strands with oxidized surfaces). This helps to avoid having the strands of copper stick together by diffusion as a result of the heating step later described in my bonding method.

Prior to bonding the structured copper disk 30 to metallic foil 32, these materials should be cleaned. The surface of the structured copper disk 30 must be clean and free of oxide. To accomplish this, sputter etching may be used. Alternatively, the surface of structured copper disk 30 may be cleaned by etching in hydrol and then rinsing in methanol. If copper foil is to be bonded to the structured copper disk 30, the copper foil is first annealed in hydrogen at approximately 1,000 C. to make it pliable and more flexible. Prior to positioning in the diffusion bonding press 10, the copper foil is degreased in solvent and etched in hydrol. Hydrol comprised of the ratio of 5 ml HCl to 100 ml methanol has been found to be effective, although other proportions are also usable. After the copper foil is etched in hydrol, it is rinsed in methanol and is at this point, sufficiently clean to undergo diffusion bonding. If gold foil to is to be bonded to structured copper disk 30, it is merely cleaned by degreasing in solvent just prior to bonding.

Figure 3:
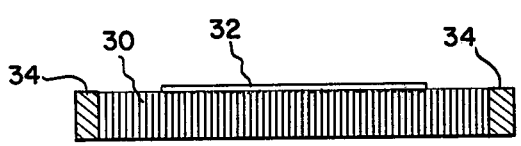
FIG. 3 is a side view of a structured copper disk having metal foil bonded thereto by the apparatus shown in FIG. 1, showing the retaining ring for holding the structured copper during the bonding operation still in place.
Figure 4:
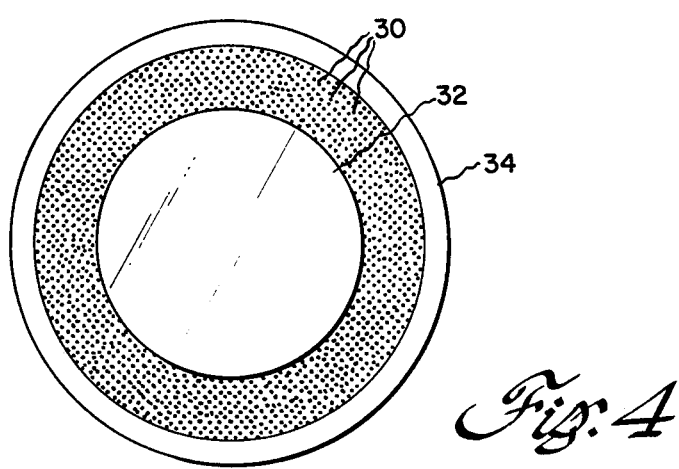
FIG. 4 is a top view of the structured copper disk shown in FIG. 3.

The surfaces of the structured copper disk 30 and metallic foil 32 to be bonded together are positioned in contact with each other and the resulting foil-disk assembly shown in FIG. 3, is positioned in diffusion bonding press 10 shown in FIG. 1, between metallic pressing block 16 and lower metallic plate 14. A conventional press is used to create a central loading force to squeeze upper plate 12 and lower plate 14 together. Steel bolts 18, 20, 22, 24, 26 and 28 are then tightened down evenly with an applied torque ranging from 10 to 20 ft-lbs using a torque wrench.

The diffusion bonding press 10 with the foil-disk assembly therein is then placed in an inert atmosphere and heated in the range of 300° C.–400° C., typically about 350° C. for about 15 minutes to 5 hours. Metallic pressing block 16, upper plate 12 and lower plate 14, all comprised of stainless steel have a higher thermal coefficient of expansion than steel bolts 18–28 and are of sufficient thickness such that, when heat in the range of 300° C.–400° C. is applied to diffusion bonding press 10, block 16 and plate 12 and 14 expand more than steel bolts 18–28. This results in pressure ranging between 20,000 and 50,000 psi, and which is typically 30,000 psi, thus constituting sufficient pressure to insure intimate contact between metallic foil 32 and structured copper disk 30. The apparatus of the invention is not limited to the use of stainless steel for the plates and block, and steel for the bolts, in press 10. Rather, any metals having a sufficiently different thermal coefficient of expansion and appropriate dimensions in the vertical direction may be utilized. The elevated temperature in the range of 300° C.–400° C. is sufficiently high to cause diffusion of the metallic foil, whether it be copper or gold, into the structured copper disk, resulting in a diffusion bond.

Although a diffusion bond between a metallic foil and structured copper may be created in a conventional press at a substantially higher elevated temperature than employed in the present invention, such higher elevated temperature results in the individual strands of the structured copper disk sticking together by diffusion. The strands are thus rendered incapable of independent movement, substantially reducing the stress relieving capability of the disk. Use of lower temperatures and structured copper strands with oxide unremoved, as set forth in the present invention, overcomes this problem.

After diffusion bonding is completed, retaining ring 34 is removed from structured copper disk 30. Any strands of copper outside of the area of the structured copper bonded to the foil are also removed. It should be noted that any shape structured copper strain buffer may be made by simply cutting the foil to the desired shape prior to diffusion bonding.

The disclosed diffusion bonding apparatus and method may be used to thermo-compression diffusion bond metallic surfaces including copper, aluminum, gold, slver, titanium and molybdenum to themselves and to each other.

The foregoing describes a thermo-compression diffusion bonding press for bonding a metallic foil to a structured copper buffer to create a disk of high structural strength, and a method of performing such bonding in a manner which preserves the stress relieving properties of the structured copper buffer.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What is claimed is:

1. A method of thermo-compression diffusion bonding metallic foil to a structured copper strain relief disk, said disk comprising straight filamentary strands of oxide-coated copper arranged in parallel fashion and closely packed together, said method comprising:

positioning the disk and metallic foil in substantial abutment with each other;

surrounding said disk and said metallic foil with an inert atmosphere;

applying a loading force to squeeze together at high pressure, said disk and said metallic foil; and heating said disk and said metallic foil at a temperature within the range of 300° C. to 400° C. while said disk and said metallic foil are being squeezed together.

2. The method of claim 1 wherein said high pressure is within the range of approximately 20,000 to 50,000 psi.

3. The method of claim 1 wherein said disk and said metallic foil are heated at approximately 350° C. for a time within the range of approximately 15 minutes to 5 hours while said disk and said metallic foil are being squeezed together.

4. The method of claim 1 wherein said metallic foil is comprised of one of the group consisting of gold and copper.

5. The method of claim 1 including the steps of cleaning said disk to eliminate surface oxide thereon and degreasing and cleaning said metallic foil prior to positioning said disk and said metallic foil in substantial abutment with each other.

6. The method of claim 5 wherein the step of cleaning said disk comprises sputter etching of said disk.

7. The method of claim 5 wherein the step of cleaning said disk comprises etching said disk in hydrol and thereafter rinsing said disk in methanol.

* * * * *